United States Patent Office 2,976,275
Patented Mar. 21, 1961

2,976,275

SURFACE ACTIVE COMPOUNDS DERIVED FROM CARBOHYDRATES

Ernest L. Pollitzer, Hinsdale, Ill., assignor, by mesne assignments, to Universal Oil Products Company, Des Plaines, Ill., a corporation of Delaware No Drawing. Filed Dec. 28, 1956, Ser. No. 631,053

14 Claims. (Cl. 260—211)

This invention relates to a new class of surface active agents and to the process for preparing the same which involves the reductive alkylation of an amino or nitro derivative of a hydrophobic hydrocarbon compound with a reducing sugar followed, if desired, by further condensing the resulting carbohydrate derivative with an oxyalkylating agent to increase the size and effectiveness of the hydrophilic group in the structure of the product. More specifically, this invention relates to a process which involves condensing an amine containing a hydrophobic hydrocarbon radical with a reducing sugar and thereafter, if desired, further condensing the resulting carbohydrate derivative with an oxyalkylating compound to introduce at least one hydrophilic poly-oxyalkylene chain into the product.

The process of the present invention is intended to produce non-ionic surface active agents from lipophilic starting materials by introducing a hydrophilic group into the lipophilic reactant, the surface activity, water solubility, and physical state of the product being pre-determinable by varying the structure and relative size of the hydrophilic and hydrophobic portions of the molecule. Thus, a series of compounds having a surface activity in non-aqueous solvents, such as hydrocarbon and vegetable oils, may be formed from a hydrocarbon starting material in a specific sequence of reaction steps, or, if desired, a surface active product which is effective in aqueous solutions may be formed from the same or similar hydrocarbon starting material by means of a series of different reaction steps or utilizing a different class of reactants charged to the process.

In one of its embodiments, the present invention concerns a process for the production of a nitrogen-containing carbohydrate condensation product which comprises reacting a lipophilic compound selected from the mono-nitro and mono-amino substituted hydrocarbons containing at least 9 carbon atoms per molecule with a reducing sugar in the presence of hydrogen at reaction conditions whereby the carbohydrate is condensed with said lipophilic compound to form a secondary amine and thereafter condensing the resulting amine with an oxyalkylating agent to introduce at least one poly-(oxyalkylene) chain.

A more specific embodiment of the invention relates to a composition formed by a series of reactions comprising: (1) reductively alkylating glucose with mono-nitro-dodecyl-toluene and (2) thereafter condensing the resulting secondary amine with from 2 to about 20 moles of ethylene oxide per mole of said amine in the presence of a basic condensation catalyst.

Additional embodiments of the invention which relate to the process of manufacturing the present products and to specific compounds within the broad class of compounds herein provided will be referred to in greater detail in the following further description of the invention.

The products of this invention are members of a class of compounds which have surface active properties, some being active in aqueous solution while others are active in non-aqueous solvents. Thus, one series of compounds is particularly effective when dissolved in a non-aqueous solvent, such as a liquid hydrocarbon, and the other series is more readily soluble in water to provide a class of surface active agents useful as detergents in aqueous solution. Both types of surface active product contain a hydrophilic radical combined with a hydrophobic radical, the relative size of the hydrophilic and hydrophobic portions determining whether the ultimate product is soluble or insoluble in aqueous solvents. The present products, furthermore, are essentially non-ionic materials, that is, the products when dissolved in a solvent with which it is compatible are substantially neutral or at most, slightly basic and thus do not ionize to form either basic or acidic ions in solution, as in the case of many other types of surface active materials.

The hydrophobic portion of the present surface active compounds is a hydrocarbon radical containing at least 9 carbon atoms which may be present in an aliphatic chain (preferably an alkyl radical of relatively straight-chain configuration), an alkylaromatic group, or an alkyl-substituted cycloalkyl radical. These radicals which are present in the lipophilic secondary amine or nitro-substituted hydrocarbon starting material include such typical alkyl substituents as nonyl, decyl, lauryl (dodecyl), tridecyl, tetradecyl, pentadecyl, hexadecyl, octadecyl, etc., and although these may be of straight-chain or branched-chain configuration, the straight-chain compounds are preferred because of the greater surface activity of products prepared therefrom. The initial starting materials from which such radicals are derived may be an amine or a nitroalkane, depending upon availability. The alkyl amines are readily available articles of commerce, the long chain alkyl amines, such as the products formed by amination of fatty acids (e.g. tallow amines) being readily prepared and are, therefore, generally preferred herein as the source of the alkyl amine starting materials. Another preferred class of starting materials in the present process comprise certain alkylated aromatic hydrocarbons of mono- or bicyclic structure which may be readily nitrated and may be readily reduced to the corresponding amine, if desired. The cyclic hydrocarbon alkylates contain a nuclear alkyl substituent containing from 9 to about 18 carbon atoms when the nucleus is monocyclic and from 5 to about 9 carbon atoms when the nucleus is bicyclic. The alkyl substitution on the ring may be made up of several short chain alkyl substituents, such as methyl, ethyl, propyl, etc., in addition to the long chain alkyl group containing from 5 to 9 or 9 to 18 carbon atoms, respectively. Thus, typical representative starting materials of the alkylcyclic hydrocarbon type are, for example, nonylbenzene, decylbenzene, dodecylbenzene, pentadecylbenzene, octadecylbenzene, nonyltoluene, decyltoluene, tridecyltoluene, pentadecyltoluene, and octadecyltoluene, nonylxylene, decylxylene, dodecylxylene, etc., amylnaphthalene, hexylnaphthalene, diamylnaphthalene, amyldimethylnaphthalene, hexyldiphenyl, dodecylcyclohexene, or other alkyl-substituted aryl hydrocarbons. One of the preferred classes of starting materials are the propylene polymer alkylates of benzene and toluene which may be formed by reacting a propylene polymer, such as a tetramer fraction, with benzene or toluene in the presence of an alkylation catalyst of the acid-acting type which produces an alkylate capable of being mono-nitrated to form a nitro-aromatic hydrocarbon utilizable as starting material and the resulting nitro derivative reduced to an aromatic amine or naphthenic amine, also utilizable as a starting material.

The introduction of an amino group on the nucleus of the alkylaromatic hydrocarbon may be effected by a process well known in the chemical art, for example, by nitrating the hydrocarbon (e.g., with a sulfuric-nitric acid mixture) and thereafter reducing the nitro group to the amino group in a hydrogenation process, usually with the aid of a hydrogenation catalyst. Alternatively, the nitro group resident within the structure of the nitro-substituted hydrophobic hydrocarbon radical may be reduced in situ during the subsequent condensation with a carbohydrate by the method generally known as "reductive alkylation," a method hereinafter more fully described.

In the event that a mono-nitro derivative of the lipophilic hydrocarbon is utilized as the primary starting material in the present process, the nitro radical is reduced to an amino group either in a preceding hydrogenation reaction or during the reductive alkylation reaction itself, which involves, in effect, reduction and condensation of the nitro compound with a reducing sugar in a single step to form a surface active product, which, if desired, may be reacted in the subsequent stages of the process. Simple reduction of the nitro group, for example, may be effected by reducing the nitrated alkyl-aromatic hydrocarbon or nitroalkane with hydrogen at relatively mild hydrogenation conditions, usually in the presence of a hydrogenation catalyst of a type well-known for this purpose. The reduction of the nitro group to an amino radical may be effected, for example, by charging a mixture of the hydrogenation catalyst and the nitro derivative into a pressure autoclave and heating the mixture at a temperature of from about 50° to about 150° C. or higher at a hydrogen pressure of from 10 to about 500 atmospheres. Suitable hydrogenation catalysts include, for example, composites of nickel and kieselguhr, nickel, cobalt and alumina, alumina and chromia and alumina and molybdenumoxide, etc. When the aromatic structure of the cyclic hydrocarbon ring is to be retained in the final product, the temperature and pressure conditions maintained during the hydrogenation reaction are such that the aromatic nucleus does not undergo hydrogenation, the reaction being effected generally at relatively low temperatures and pressures. However, when the corresponding alkyl naphthenes are desired as the hydrophobic hydrocarbon group, the hydrogenation process may be effected at relatively high temperatures and pressures and/or in the presence of a more active hydrogenation catalyst such as a supported platinum or palladium composite to simultaneously reduce the carbon atom structure of the aromatic ring as well as the nitro radical to the amino group.

Following completion of the nitro-reduction reaction, the resulting amino group may be reductively condensed with a carbohydrate containing a keto or an aldehyde group (that is, a reducing pentose or hexose) in the presence of a suitable solvent for both the carbohydrate and the amino or nitro compound at condensation reaction conditions sufficient to alkylate the amino group with the carbohydrate molecule. In the alternative form of reaction wherein the intermediate nitro compound is reductively alkylated with the carbohydrate directly without intermediate reduction of the nitro group to an amino group, the reducing sugar is mixed directly with the nitro compound in the presence of hydrogen to effect the desired reductive alkylation. The indicated condensation reaction is preferably carried out in the presence of a hydrogenation catalyst selected from the metals, their oxides and sulfides known to have reducing properties, generally a metal selected from the elements of group VIII of the periodic table, such as an alumina-supported platinum composite, an iron group metal, such as nickel or cobalt supported on alumina, silica, or molybdena, a copper chromite catalyst or other well-known reduction catalyst which effects the reductive alkylation of the resulting amino group with the carbonyl radical, the resulting condensation being essential to form the carbohydrate alkylate. In the reductive alkylation of the carbohydrate with the amine or nitro compound, the reaction is effected in the presence of the aforementioned hydrogenation catalyst at temperatures of from about 50° to about 180° C. or higher, hydrogen being present in the reaction mixture at a pressure of from about 10 to about 500 atmospheres. The carbohydrate and nitro or amino compound generally react in equimolar proportions, although it may be advantageous to utilize an excess of one of the reactants in order to force the reaction to completion and thereafter remove the unreacted excess reactant from the reaction mixture.

The carbohydrate reactant utilized in the alkylation or reductive alkylation stage of the present process is specified as a reducing sugar, that is, a pentose or hexose monosaccharide containing a keto or an aldehyde group in its structure. Aside from the relatively rare sugars of this type, such as mannose and galactose, the relatively more abundant glucose and fructose are particularly suitable in the present process because of their availability.

Typical suitable solvents for this reaction include certain organic compounds which dissolve both the carbohydrate and the lipophilic reactant, including certain amides such as dialkylformamides, and acetamide, certain alcohols, such as methanol and ethanol, and certain ethers such as the alkyl ethers of the polyalkylene glycols. Water may be added to the solvent in order to increase the solubility of the solvent for the carbohydrate present in the mixture.

Following completion of the condensation reaction between the reducing carbohydrate and the previously prepared nitro or amino compound, the product of this condensation reaction is preferably further condensed with an oxyalkylating agent in order to introduce additional hydrophilic groups into the composition, although for certain purposes the carbohydrate condensation product is sufficiently water-soluble and contains a carbohydrate residue of sufficient hydrophilic effect to produce a surface active material without further condensation with an oxyalkylating agent. Thus, the previously prepared intermediate condensation product is generally a wetting or emulsifying agent but by introducing additional hydrophilic groups into the carbohydrate condensation product by means of the indicated oxyalkylation reaction, a more nearly balanced relationship between the hydrophobic and hydrophilic groups is attained and the resulting product may possess detergent qualities. One of the most effective means of increasing the size and effectiveness of the hydrophilic group in the carbohydrate residue is to react the intermediate carbohydrate condensation product with an oxyalkylating agent, such as ethylene oxide or glycidol which condenses with the hydroxyl and/or sec-amino groups in the carbohydrate residue to form hydrophilic poly-(oxyalkylene) chains in the resulting product. It is to be emphasized, however, that the latter condensation reaction is not necessarily an essential stage in the process for producing surface active agents, but is generally necessary for the production of compositions having detergent qualities. In the preparation of the latter detergent products, generally from 2 to about 20 oxyethylene or glycidol units are introduced into the intermediate carbohydrate condensation product to form a product having the indicated detersive qualities, although more highly water-soluble, higher melting products may be formed by increasing the number of such oxyalkylene units per molecule, generally up to a maximum of about 50.

The reaction of an oxyethylating agent with the intermediate condensation product occurs by way of further condensation between the hydroxyl groups of the carbohydrate residue in the intermediate and the oxyalkylating agent in the presence of a basic catalyst and at temperatures above room temperature, preferably from about 50° to about 180° C., maintaining sufficient pressure only to provide liquid phase conditions in the reaction mixture. Suitable oxyalkylating agents include ethylene oxide, glycidol, and various alpha-chloro- and alpha-bromohydrins of the polyethylene glycols. When utilizing ethylene oxide, generally the preferred oxyalkylating agent, sufficient ethylene oxide is charged into the reaction mixture to produce a poly-(oxyethylene) chain having sufficient hydrophilic effect to form a surface active product. For this purpose, usually a molar ratio of ethylene oxide to carbohydrate-amine condensation product of from 2 to 1 to about 20 to 1 is sufficient to produce a detergent-type compound. When reacting an alpha-chlorohydrin derivative of a polyethylene glycol with the intermediate carbohydrate condensation product, the initial halohydrin may contain the desired number of oxyethylene units to form the product of the required surface activity, or the alpha halohydrin of ethylene glycol may be initially reacted with the intermediate carbohydrate condensation product, followed by the further condensation of ethylene oxide or glycidol with the initial condensation product to introduce the required number of oxyalkylene units into the compound.

Suitable basic condensation catalysts for the oxyethylation reaction may be selected from the organic or inorganic alkaline materials, such as powdered sodium hydroxide, potassium hydroxide and lithium hydroxide, the alkali metal alkoxides or phenolates, such as sodium methylate, sodium phenolate, potassium cresolate, etc., an organic nitrogen base, such as pyridine, pyrimidine, trimethylamine, trimethyl ammonium hydroxide and others of generally alkaline character. Another suitable catalyst is the sodium or potassium alcoholate formed by the addition of the free alkali metal to the intermediate carbohydrate condensation product. These catalysts may be supplied to the oxyalkylation reaction in amounts of from about 0.5% to about 10% by weight of the intermediate carbohydrate condensation product to provide sufficient catalyst to effect the desired condensation.

The products of this invention exist in the form of materials varying from viscous liquids to solid, wax-like products and of varying solubilities in water, depending upon the size and effect of the hydrophilic group in the molecular structure of the product. Thus, the simple condensation product of the carbohydrate with a relatively high molecular weight amine or the nitro-compound, containing only the carbohydrate residue as the hydrophilic portion of the molecule, may be readily soluble in hydrocarbon or organic solvents, whereas the product formed by condensation of an oxyalkylating agent with the carbohydrate-amine or carbohydrate-nitro condensation compound may be insoluble in such organic solvents as liquid hydrocarbons, but appreciably soluble in equeous media, making the latter product particularly useful as a detergent for use in aqueous systems, such as a washing powder, a hand soap, etc.

The present invention is further described with respect to several of its specific embodiments in the following examples which are intended merely for illustrative purposes and not for necessarily limiting the scope of the invention in accordance therewith.

*Example 1*

A number of alkyltoluenes, alkylnaphthalenes and alkylamines were prepared or selected for providing the initial starting material in the ultimate preparation of surface active products. When starting with an alkylaromatic hydrocarbon, these hydrocarbons are mono-nitrated, thereafter reduced to amines and the amino hydrocarbon resulting from the reduction reaction condensed with a reducing sugar. In some cases, the carbohydrate-amine intermediate is further condensed with ethylene oxide to form water-soluble surface active products. An alkyltoluene in which the alkyl group is dodecyl, an alkylnaphthalene in which the alkyl group is amyl and an alkylamine containing from 16 to about 18 carbon atoms (tallow amine) were prepared by appropriate synthetic means or purchased and utilized as the charging stock in the subsequent condensation reactions. Dodecyltoluene was prepared by alkylating toluene with propylene tetramer (the 170° to 225° C.) fraction of propylene polymer in the presence of 98.5% sulfuric acid, utilizing 5 moles of toluene per mole of propylene tetramer in the reaction mixture, the reaction being carried out at about 10° C., followed by distillation of the product to separate a fraction boiling from 285° to about 325° C. from unreacted starting materials and polyalkylates. Amylnaphthalene was prepared by reacting n-amylene with naphthalene in a reaction catalyzed by 98.5% sulfuric acid and separating the mono-amynaphthalene from the hydrocarbon phase formed in the reaction mixture by fractional distillation. Tallow amine was obtained from commercial sources, being a mixture of $C_{16}$–$C_{18}$ amines, containing predominantly octadecylamine.

The above alkylaromatic hydrocarbons are converted to their mono-nitro derivatives by means of a procedure common to all of the hydrocarbons wherein the hydrocarbon is reacted at a temperature of from about 10° to about 25° C. with a mixture of 1.3 mols of approximately 70% nitric acid (specific gravity 1.42) and 1.7 volumes of 98.5% sulfuric acid, based upon the volume of nitric acid, per mole of hydrocarbon, the nitrating agent being added dropwise to the hydrocarbon with stirring as the temperature is maintained within ±10° C. of the above temperature range. In those instances in which the nitrated hydrocarbon is reduced to the corresponding amino derivative prior to condensation with the reducing sugar, reduction of the nitro group only of the mono-nitro aromatic hydrocarbon without reduction of the unsaturated linkages in the aryl nucleus is effected by dissolving the nitro hydrocarbon in an equal volume of absolute ethanol, mixing the resulting solution with 10% by weight of a nickel-kieselguhr hydrogenation catalyst and placing the mixture of organic material and catalyst in a pressure autoclave, which is thereafter sealed and pressured to 100 atmospheres of hydrogen, followed by rotating the autoclave at 25° C. for approximately 7 hours. Following the indicated reduction, the batch is removed from the autoclave, the catalyst filtered from the liquid product and the solvent separated from the hydrogenated product by distillation at atmospheric pressure. The higher boiling bottoms material is fractionated at a pressure of approximately 2 mm. Hg absolute pressure, the material of the appropriate boiling point being separately collected.

Condensation of the above amines with a reducing sugar is effected by reacting a mole of glucose with a molar equivalent of the amine in the presence of 10% by weight of the amine of a nickel-kieselguhr hydrogenation catalyst at a temperature of 110° C. and in the presence of hydrogen at a pressure of 50 atmospheres for a reaction period of from 5 to 7 hours. The solid catalyst is filtered from the solution of the condensation product of the amine with the carbohydrate and the product recovered from the filtrate by evaporating the solvent.

The above product which consists of an equimolar condensation product between toluidine or amylnaphthalene with glucose is also formed by the reductive alkylation of the nitro-aromatic hydrocarbon (dodecylnitrotoluene and amylnitronaphthalene) with glucose in the presence of a hydrogenation catalyst, such as an alumina supported copper chromite catalyst. For this purpose, a mixture of the nitro aromatic hydrocarbon (such as dodecyl nitrotoluene) and glucose are placed in a rotating autoclave, together with 15 weight percent of the dodecyltoluene of a composite of copper chromite and alumina containing about 8% by weight of copper chromite, the catalyst being charged into the autoclave in the form of granules approximately 1 mm. in diameter. The resulting mixture is sealed into the pressure autoclave with hydrogen at 35 atmospheres and heated with rotation of the autoclave to a temperature of 120° C. for approximately 6 hours. Following the indicated reaction period, the mixture from the autoclave is filtered to remove catalyst.

The intermediate condensation products, as prepared above, are soluble in water to varying degrees. An aqueous solution of these products, containing 0.3% by weight of the organic material, are surface active in that they reduce the surface tension of water and are highly effective wetting agents.

*Example II*

The condensation products of glucose with dodecyltoluidine and amylnaphthylamine are sparingly soluble in water, but to the extent that they do dissolve in water, the resulting aqueous solutions markedly reduce the surface tension of water.

The above maine-glucose condensation products may be utilized as intermediates in the preparation of products having greater surface activity, some of the products being detergents, by further condensing the intermediates with various proportions of ethylene oxide or by reacting the intermediates with the α-chlorohydrin of a polyethylene glycol having sufficient hydrophilic properties to produce a surface active condensation product, in accordance with the following procedure.

423 grams (1.0 mole) of the glucose condensation product of dodecyltoluidine and 21 grams of anhydrous sodium methoxide catalyst are mixed in a stirred pressure autoclave. The mixture is cooled to below the freezing point of water with a salt-ice bath and 88 grams (2 moles) of ethylene oxide condensed into the cooled liquid. The autoclave is thereafter sealed and slowly heated to 120° C. as the autoclave is stirred, heating being continued for 6 hours at this temperature. A sample of the product removed after the above reaction period is in the form of a viscous semi-solid material at room temperature, the product being much more effective in lowering the surface tension of water than the intermediate. The ethylene oxide condensation product is approximately three times as soluble in water as the intermediate and a 0.3% aqueous solution has a detergency approximately equal to an aqueous solution of the same concentration of sodium laurate.

The remainder of the oxyethylation reaction mixture in the autoclave is mixed with an additional 2 moles of ethylene oxide and the condensation reaction repeated. The product is a solid wax-like material which forms opalescent aqueous solutions. A 0.3% aqueous solution of the product, which is essentially neutral, is a more effective detergent in aqueous solution than an aqueous solution of the same concentrations of sodium laurate. Repeated condensations with additional quantities of ethylene oxide yield products of progressively higher melting points and greater solubility in water. The product containing 6 oxyethylene units per molecule is a highly effective detergent in aqueous solution.

The glucose condensation product of amylnaphthalene is condensed with an oxyethylated ethylene chlorohydrin having an average molecular weight of about 610 in accordance with the following procedure: 377 grams (1 mole) of the above mentioned glucose condensate of amylnaphthalene (1 mole), 40 grams of anhydrous powdered sodium hydroxide and 610 grams (1 mole) of the above chlorohydrin are stirred in a rotating autoclave at 80° C. for 3 hours to effect the condensation of the reactants. The product is a waxy solid, quite soluble in water. Its aqueous solutions are effective detergents.

The condensation product of octadecylamine and glucose is itself an effective surface active agent when dissolved in a non-aqueous solvent such as a lubricating oil or cleaners naphtha.

I claim as my invention:

1. A process for the production of a nitrogen-containing carbohydrate condensation product which comprises reacting a lipophilic compound selected from the group consisting of the mono-amino and mono-nitro-substituted monocyclic hydrocarbons containing an alkyl group of at least 9 carbon atoms with a reducing sugar in the presence of hydrogen and at a reductive alkylation temperature of from about 50° to about 180° C. sufficient to condense said lipophilic compound with said carbohydrate to form a secondary amine and thereafter condensing the resulting product with an oxyalkylating agent in the presence of a basic condensation catalyst and at a condensation temperature of from about 50° C. to about 180° C. sufficient to form a poly-(oxyalkylene) chain containing at least 2 oxyalkylene units per molecule.

2. The process of claim 1 further characterized in that said reducing sugar is a hexose.

3. The process of claim 2 further characterized in that said hexose is glucose.

4. The process of claim 2 further characterized in that said hexose is fructose.

5. The process of claim 1 further characterized in that said lipophilic compound is a nuclearly mono-nitrated alkylbenzene hydrocarbon in which the alkyl group contains from 9 to about 18 carbon atoms.

6. The process of claim 1 further characterized in that said oxyalkylating agent is ethylene oxide.

7. The process of claim 1 further characterized in that said oxyalkylating agent is an alpha-halohydrin derivative of a polyethylene glycol containing from 2 to about 20 oxyethylene units per molecule.

8. The process of claim 1 further characterized in that oxyalkylating agent is glycidol.

9. A nitrogen-containing reducing sugar derivative formed by the process of claim 1.

10. The derivative of claim 9 further characterized in that said derivative contains from 2 to about 20 oxyalklene units per molecule.

11. The process of claim 1 further characterized in that said oxyalkylating agent is selected from the group consisting of ethylene oxide, an alpha-halohydrin of a polyethylene glycol and glycidol.

12. A process which comprises reacting mono-nitro-dodecyltoluene with glucose at a temperature of from about 50° to about 180° C. to form a secondary amine, and condensing said amine with from 2 to 20 moles of ethylene oxide per mole of amine.

13. The compound formed by the process of claim 12.

14. The process of claim 1 further characterized in that the lipophilic compound is a mono-nitro-substituted hydrocarbon.

References Cited in the file of this patent

UNITED STATES PATENTS

| | | |
|---|---|---|
| 1,985,424 | Piggott | Dec. 25, 1934 |
| 2,016,956 | Calcott | Oct. 8, 1935 |
| 2,016,962 | Flint et al. | Oct. 8, 1935 |
| 2,193,433 | Salzberg | Mar. 12, 1940 |
| 2,422,997 | Wuest | June 24, 1947 |
| 2,813,092 | Zech | Nov. 12, 1957 |

OTHER REFERENCES

Erickson: "JACS," vol. 77, No. 10, May 20, 1955, pages 2839 to 2841 relied on.